(12) United States Patent
Onuma et al.

(10) Patent No.: US 7,719,707 B2
(45) Date of Patent: May 18, 2010

(54) PRINTING SYSTEM, PRINTING METHOD, IMAGE CAPTURING APPARATUS, IMAGE PROCESSING METHOD, STORAGE MEDIUM, AND PROGRAM

(75) Inventors: Nobuo Onuma, Yokohama (JP); Masao Kato, Kawasaki (JP); Yoshiro Udagawa, Minamisaitama-gun (JP); Kenji Takahashi, Urayasu (JP); Kenji Kyuma, Yokohama (JP); Futoshi Sasaki, Kawasaki (JP); Ryuichi Kobayashi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 11/042,071

(22) Filed: Jan. 26, 2005

(65) Prior Publication Data

US 2005/0219555 A1    Oct. 6, 2005

(30) Foreign Application Priority Data

Jan. 30, 2004    (JP)    .............................. 2004-023583

(51) Int. Cl.
*G06F 3/12*    (2006.01)

(52) U.S. Cl. .......................... 358/1.15; 358/1.1; 358/1.9; 358/1.12; 358/1.13; 358/1.16; 382/298; 709/247

(58) Field of Classification Search ......... 358/1.1–1.16, 358/3.06, 450; 382/298
See application file for complete search history.

(56) References Cited

U.S. PATENT DOCUMENTS 6,273,535 B1    8/2001  Inoue et al. .................... 347/3
6,313,858 B1 *  11/2001  Kyogoku et al. ............ 347/215

(Continued)

FOREIGN PATENT DOCUMENTS

EP    1096372 A1 *  5/2001

(Continued)

OTHER PUBLICATIONS

T.K. Damodharan, V. Rhymend Uthariaraj, "USB Printer Driver Development for Handheld Devices", Jun. 7-10, 2004, 26th Int. Conf. Information Technology Interfaces ITI 2004, pp. 599-602.*

(Continued)

*Primary Examiner*—King Y Poon
*Assistant Examiner*—Miya J Cato
(74) *Attorney, Agent, or Firm*—Fitzpatrick, Cella, Harper & Scinto (57) ABSTRACT

Improvement of printing speed is set out in an image processing apparatus, which is connected communicably with a printing apparatus, for transferring a recorded image to the printing apparatus and having the printing apparatus print the image. To achieve this object, the present invention has the following configuration. Namely, the invention provides an image processing method of an image capturing apparatus, communicably connected with a printing apparatus which prints transmitted image data. The image processing method comprises: a receiving step (step S101, S104) of receiving information regarding a printing condition of the printing apparatus for printing the transmitted image data; a processing step (step S103, S106) of processing image data to be transmitted to the printing apparatus based on the information regarding the printing condition received in the receiving step; and a transmitting step (step S108) of transmitting the image data processed in the processing step to the printing apparatus.

5 Claims, 5 Drawing Sheets

U.S. PATENT DOCUMENTS

| | | | |
|---|---|---|---|
| 6,806,978 B1 * | 10/2004 | Tamura et al. | 358/1.15 |
| 6,937,356 B1 * | 8/2005 | Ito et al. | 358/1.16 |
| 7,038,714 B1 * | 5/2006 | Parulski et al. | 348/207.2 |
| 7,155,069 B2 * | 12/2006 | Ishizaka | 382/298 |
| 7,256,906 B2 * | 8/2007 | Nakajima | 358/1.15 |
| 7,355,736 B2 * | 4/2008 | Hoshino et al. | 358/1.15 |
| 2001/0013894 A1 * | 8/2001 | Parulski et al. | 348/207 |
| 2001/0030692 A1 | 10/2001 | Yoneda | 348/207 |
| 2001/0048534 A1 * | 12/2001 | Tanaka et al. | 358/1.16 |
| 2003/0016376 A1 * | 1/2003 | Narushima | 358/1.13 |
| 2003/0016391 A1 * | 1/2003 | Tamura | 358/1.16 |
| 2003/0084085 A1 * | 5/2003 | Breidenbach et al. | 709/1 |
| 2003/0156196 A1 | 8/2003 | Kato et al. | 348/207.2 |
| 2003/0208691 A1 * | 11/2003 | Smart et al. | 713/201 |
| 2004/0125387 A1 * | 7/2004 | Nagao et al. | 358/1.2 |
| 2004/0141211 A1 * | 7/2004 | Furukawa | 358/450 |
| 2004/0190047 A1 * | 9/2004 | Ito et al. | 358/1.15 |
| 2004/0207869 A1 * | 10/2004 | Endo | 358/1.15 |
| 2004/0212822 A1 * | 10/2004 | Schinner | 358/1.15 |
| 2005/0200900 A1 * | 9/2005 | Hirano | 358/3.06 |

FOREIGN PATENT DOCUMENTS

| | | |
|---|---|---|
| EP | 1139224 A2 * | 10/2001 |
| JP | 8-32911 | 2/1996 |
| JP | 2001-298694 | 10/2001 |
| JP | 2003-46763 | 2/2003 |
| JP | 2003-224793 | 8/2003 |
| JP | 2003-244586 | 8/2003 |
| JP | 2003-280848 | 10/2003 |
| WO | WO 03/103285 | 12/2003 |

OTHER PUBLICATIONS

Canon Technical Report, "Direct Printing-Compatible Digital AF SLR Camera", 2003, Technical Hall, pp. 1-7.*

* cited by examiner

PRINTING SYSTEM, PRINTING METHOD, IMAGE CAPTURING APPARATUS, IMAGE PROCESSING METHOD, STORAGE MEDIUM, AND PROGRAM

FIELD OF THE INVENTION

The present invention relates to an image processing technique for processing an image recorded by an image capturing apparatus in a printing system, where a printing apparatus and the image capturing apparatus are communicably connected for directly transferring an image recorded by the image capturing apparatus to the printing apparatus and printing the image.

BACKGROUND OF THE INVENTION

Recently prevailing is a function for directly connecting a printer (printing apparatus) with a digital camera (image capturing apparatus) via an interface, e.g., USB, to directly have the printer print a photograph image recorded in a recording medium of the digital camera (e.g., refer to Japanese Patent Application Laid-Open No. 2003-280848). According to this function, it is possible to print a photograph, sensed by a digital camera, without an involvement of a personal computer. Therefore, this function is very effective for a user who is not good at operating a personal computer.

However, currently available printers are considerably inferior to personal computers in terms of CPU processing power. For this reason, in a case where a digital camera is directly connected with a printer to perform printing, the printing speed is lower than the case where printing is performed through a personal computer.

To realize a particularly high-quality color-print image, it is necessary to perform various image processing on image data. In a case where printing is performed through a personal computer, various image processing can be executed by the personal computer. By virtue of this, the printer's processing load is relatively reduced, and even a printer with low CPU processing power can achieve sufficient printing speed. On the contrary, in a case where a digital camera is directly connected with a printer to perform printing, various image processing must be performed by the printer. Since this causes an increased processing load in the printer, sufficient printing speed cannot be achieved by the current printer's CPU processing power.

Furthermore, in keeping with the high resolution trend of currently available digital cameras, the amount of image data is increasing. As a result, not only the processing time of the printer is longer, but also the data transfer time for reading the image data from a digital camera by the printer tends to be increasing. This causes deterioration in printing speed.

To cope with the above problems, for instance, it may be considered to simplify the processing function of the printer to reduce printer's processing load. However, in this case, image quality deterioration will entail in return for reduction of the processing time, and this is not appropriate.

Furthermore, for instance, the amount of image data sensed by a digital camera may be reduced (thinned) before transmitting the image data from the digital camera to the printer for reducing the data transfer time. However, reducing image data without careful consideration results in image quality deterioration; thus, it is not appropriate.

SUMMARY OF THE INVENTION

The present invention has been proposed in view of the above problems, and has as its object to improve printing speed without causing image quality deterioration in a printing system where a printing apparatus and an image capturing apparatus are communicably connected for directly transferring an image recorded by the image capturing apparatus to the printing apparatus and printing the image.

In order to achieve the above object, a print processing system according to the present invention has the following configuration. More specifically, a printing system, where a printing apparatus and an image capturing apparatus are communicably connected, for printing image data, which is transmitted by the image capturing apparatus, by the printing apparatus, the printing apparatus comprising: notification unit configured to notify the image capturing apparatus of information regarding a printing condition for printing image data transmitted by the image capturing apparatus, and the image capturing apparatus comprising: processing unit configured to process image data to be transmitted to the printing apparatus based on the information regarding the printing condition which is notified by the notification unit; and transmission unit configured to transmit the image data processed by the processing unit to the printing apparatus.

According to the present invention, it is possible to improve printing speed without causing image quality deterioration in a printing system where a printing apparatus and an image capturing apparatus are communicably connected for directly transferring an image recorded by the image capturing apparatus to the printing apparatus and printing the image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First, a brief overview of each embodiment of the present invention is described. To achieve the object of the present invention, a digital camera according to the following embodiments acquires information regarding a printing condition from a printer, and in a case where the digital camera determines that it is necessary to perform rotation processing on image data based on the information, the rotation processing which has conventionally been performed by the printer is executed by the digital camera.

The image processing time in a conventional printer not only includes the processing time for converting image data having, e.g., a JPEG format, stored in a digital camera to CMYK data suitable for printing by the printer, but also includes the processing time for converting a general landscape image sensed by a digital camera to a portrait image to match the printing paper conveyance direction of the printer (processing time for rotating the image data received from a digital camera by 90°). The present invention focuses attention on the fact that the time required for the rotation processing imposes a heavy load on a printer having low CPU processing power, similar to the conversion processing to CMYK data.

Furthermore, a digital camera according to the following embodiments is constructed in a way that the image size (the vertical pixel number and the horizontal pixel number) of image data is changed based on the information regarding a printer's printing condition, before the image data is transmitted to the printer.

This is because, in the conventional printer, in a case where image data sensed by a high-resolution digital camera is received and printed on a relatively small size of paper or a case where image data is trimmed and printed (an arbitrary portion of a sensed image, called a trimming frame, is extracted for printing), all the pixels included in the image data are not used but thinned out before printing. In other words, despite the long image data transfer time, the conventional printer utilizes only part of the data included in the image data and discards the rest. The present invention focuses attention on the construction of the conventional printer whose processing is comprehensively inefficient. Hereinafter, each embodiment of the present invention is described in detail.

First Embodiment

Figure 1:
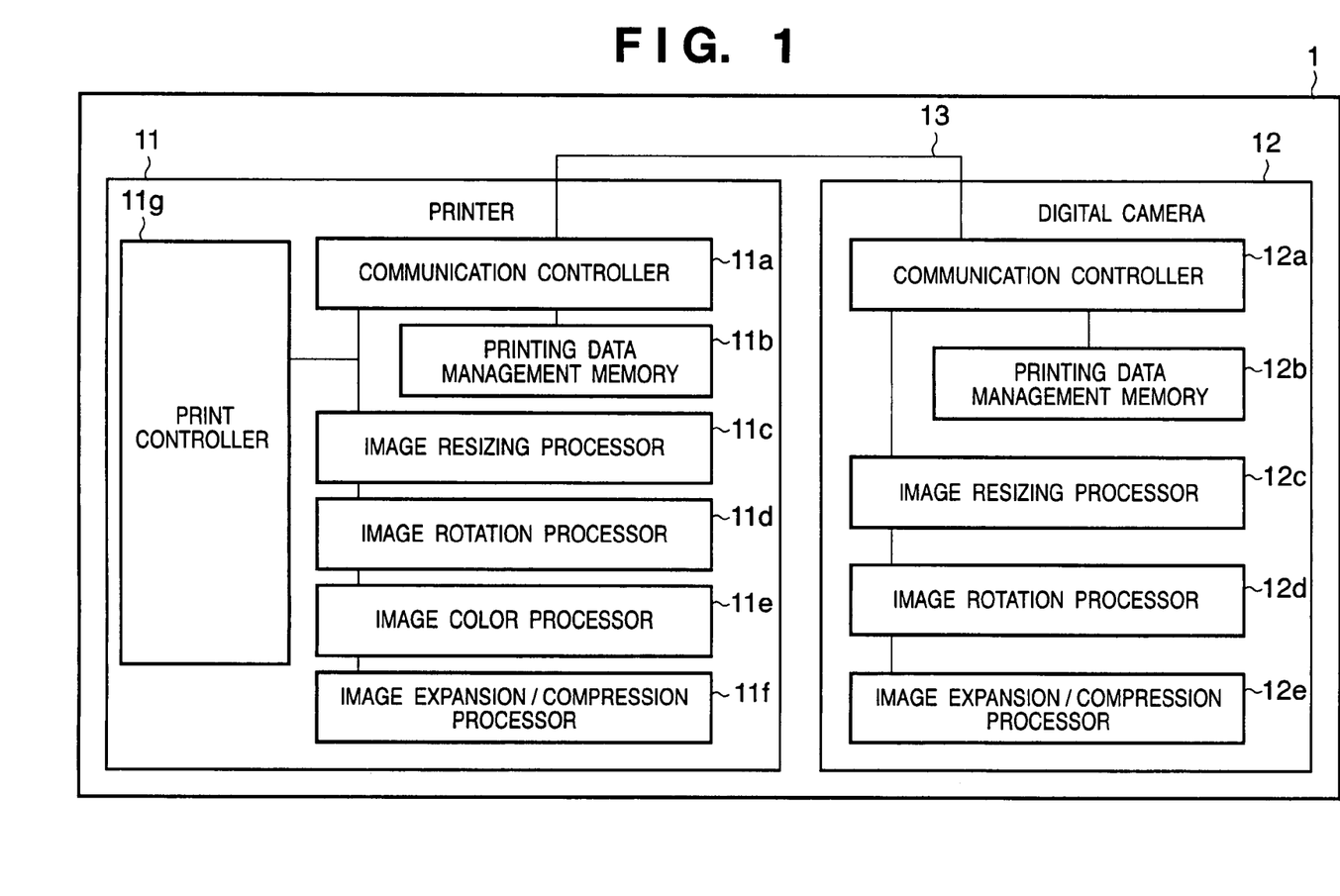
FIG. 1 is a block diagram showing a configuration of functions of a print processing system according to an embodiment of the present invention.

FIG. 1 is a block diagram showing a configuration of functions of a print processing system comprising a digital camera (image capturing apparatus) according to an embodiment of the present invention.

In FIG. 1, numeral 1 denotes a printing system, which is constituted with a printer 11 and a digital camera 12 mutually connected via an interface cable 13, e.g., a USB.

The printer 11 comprises: a communication controller 11a, a printing data management memory 11b, an image resizing processor 11c, an image rotation processor 11d, an image color processor 11e, an image expansion/compression processor 11f, and a print controller 11g.

The digital camera 12 comprises: a communication controller 12a, a printing data management memory 12b, an image resizing processor 12c, an image rotation processor 12d, and an image expansion/compression processor 12e.

The communication controller 11a transmits to the communication controller 12a of the digital camera 12, the vertical-and-horizontal pixel number (information regarding a printing condition) which is calculated based on a printing condition such as a paper size and a resolution of the printer 11, a memory capacity, performance information (information regarding printer's printing capability) such as the amount of storable image data, and so on.

The communication controller 12a receives the vertical-and-horizontal pixel number as well as the performance data from the printer 11, and transfers the data to the image resizing processor 11c and the like to be utilized in resizing or the like.

Note that in the example shown in FIG. 1, although the construction for implementing the present invention is realized with a hardware, it goes without saying that the present invention may be realized by storing a software program in a memory (not shown) which executes the present invention under computer control.

Figure 2:
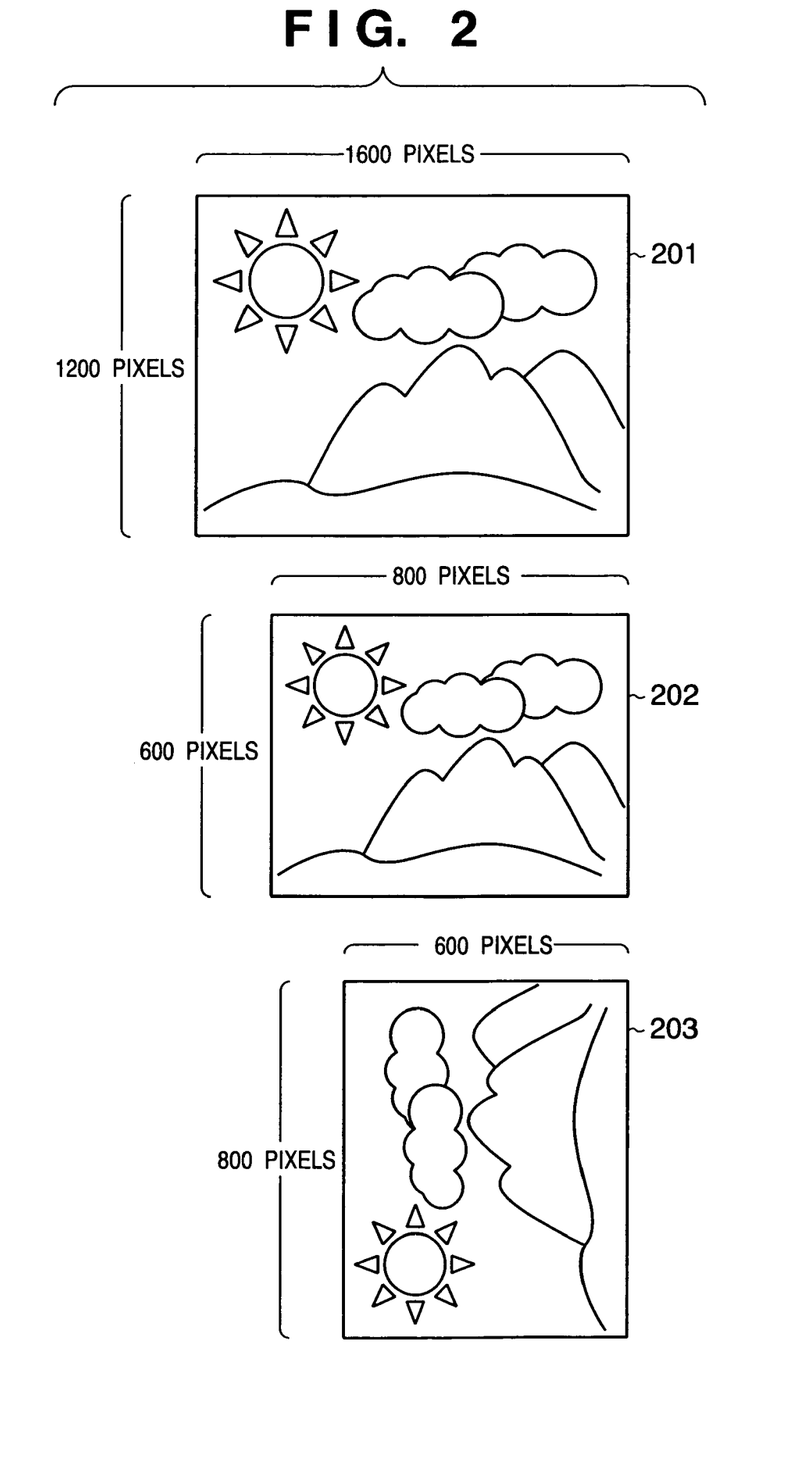
FIG. 2 is a view showing how image data is subjected to resizing and thereafter subjected to rotating.

FIG. 2 is a view showing a process of how image data, which is sensed by the digital camera 12, is adapted for printing of the printer 11. In FIG. 2, numeral 201 denotes image data of an original image sensed by the digital camera 12. Numeral 202 denotes image data where the vertical-and-horizontal pixel number of the original image 201 sensed by the digital camera 12 is resized to match the printing condition of the printer 11. Numeral 203 denotes image data where the image data 202 is rotated 90°, since the resized image data 202 does not match the printing direction of the printer 11 (i.e., because the image data 202 has a landscape direction while the printing direction of the printer 11 is a portrait direction).

Figure 3:
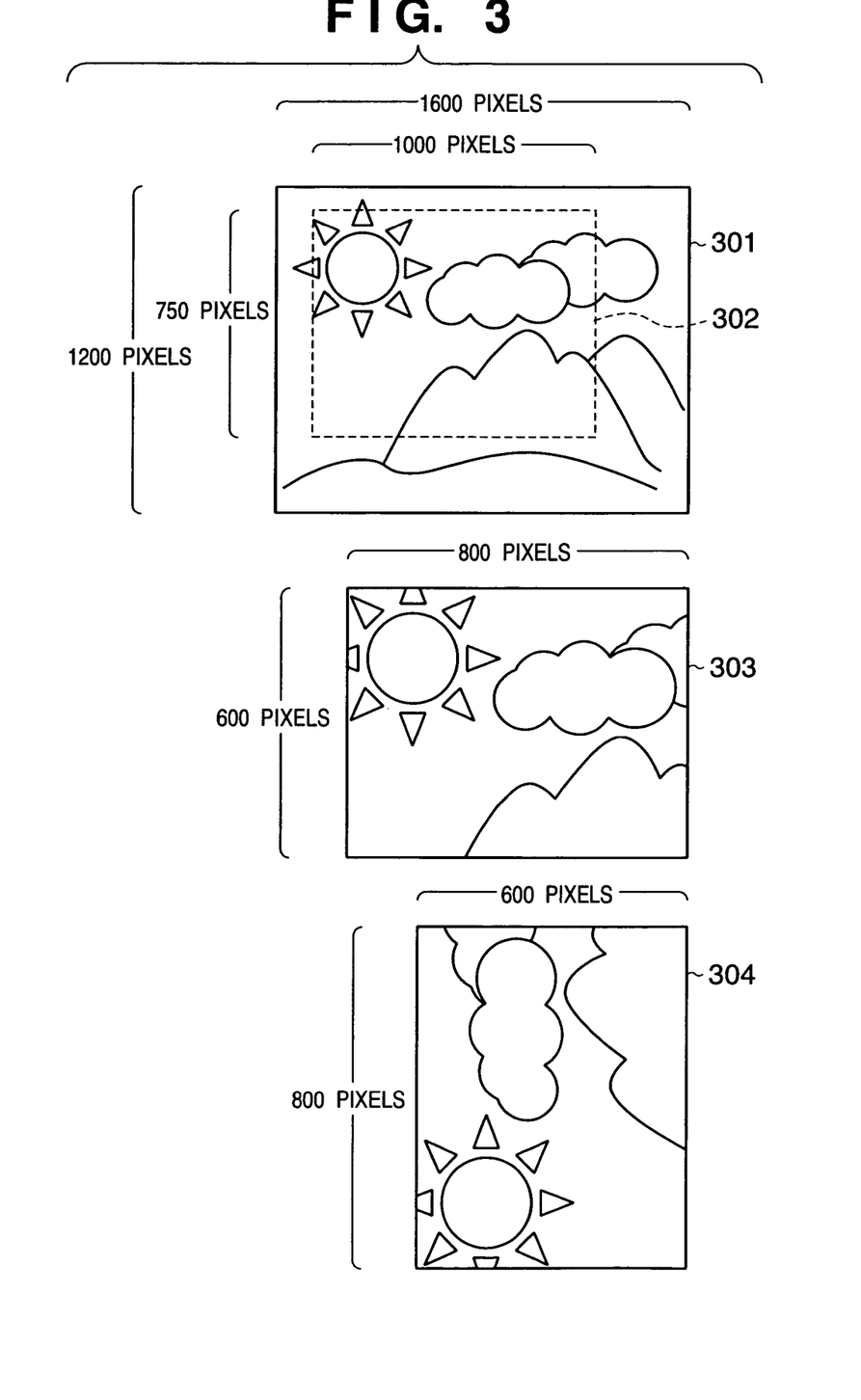
FIG. 3 is a view showing how part of image data is subjected to trimming, and thereafter subjected to resizing and rotating.

FIG. 3 is a view showing a process of how image data, which is sensed by the digital camera 12, is adapted for trimming and printing of the printer 11. In FIG. 3, numeral 301 denotes image data of an original image sensed by the digital camera 12. Numeral 302 denotes image data in the trimming frame, which designates the portion to be printed in the image data 301. Numeral 303 denotes image data where the image data designated by the trimming frame 302 is extracted from the image data 301 and the vertical-and-horizontal pixel number of the extracted image is resized to match the printing condition of the printer 11. Numeral 304 denotes image data where the image data 303 is rotated 90°, since the resized image data 303 does not match the printing direction of the printer 11 (i.e., because the image data 303 has a landscape direction while the printing direction of the printer 11 is a portrait direction).

Figure 4:
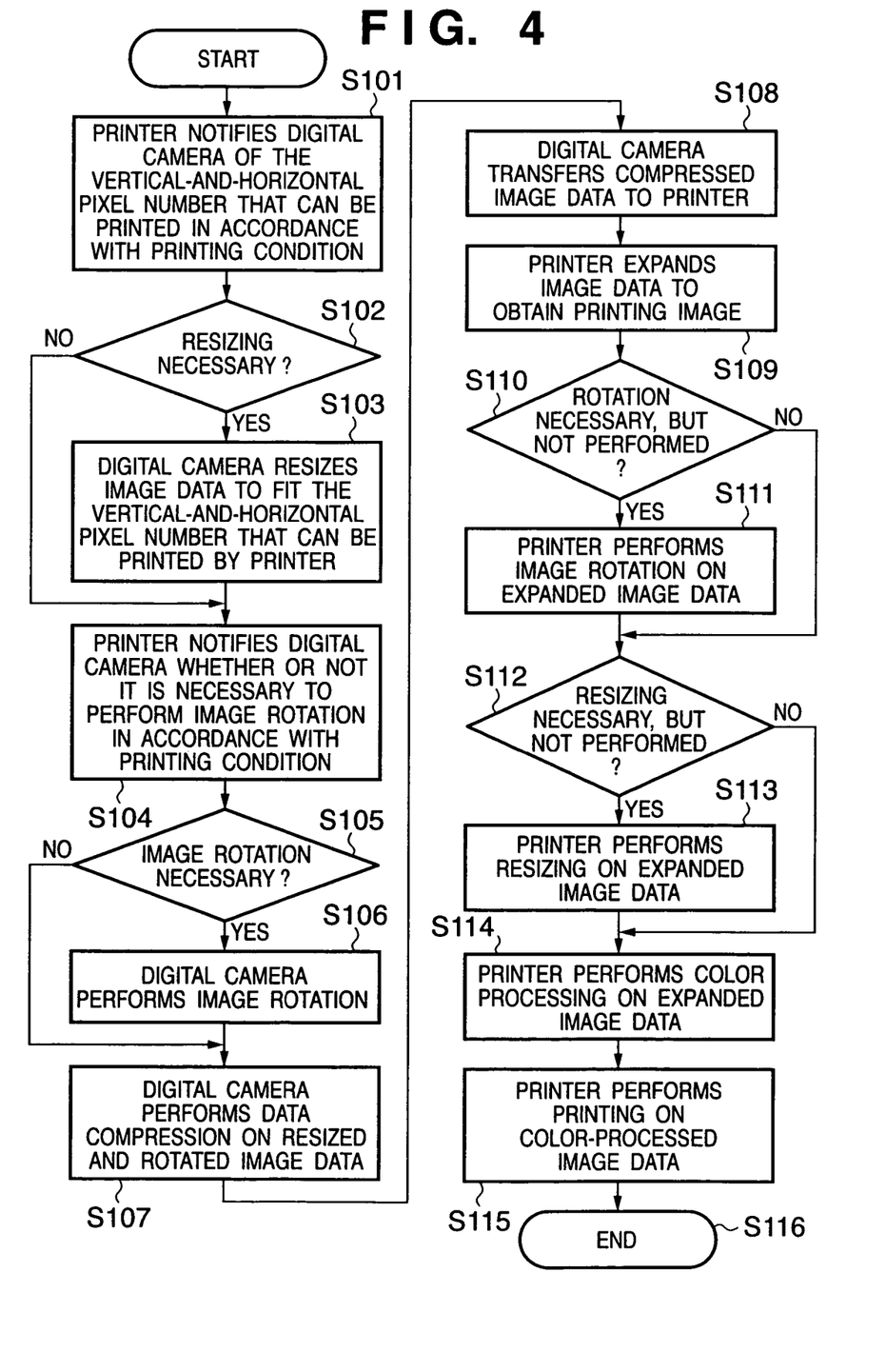
FIG. 4 is a flowchart describing an algorithm for performing resizing and rotating on image data by a digital camera and performing printing by a printer based on the processed image data.

FIG. 4 is a flowchart executed by the printing system 1 shown in FIG. 1, which describes an algorithm for performing image resizing and image rotating by the digital camera 12 in accordance with the printing condition of the printer 11.

In step S101, the printer 11 calculates the vertical-and-horizontal pixel number to be printed on paper in accordance with the printing condition, such as the size of paper and resolution. The calculated vertical-and-horizontal pixel number is notified from the communication controller 11a of the printer 11 to the communication controller 12a of the digital camera 12 using a communication protocol which is arbitrarily determined in advance between the printer 11 and the digital camera 12. The notified vertical-and-horizontal pixel number is stored in the printing data management memory 12b of the digital camera 12.

In step S102, the digital camera 12 compares the vertical-and-horizontal pixel number notified by the printer 11 with the vertical-and-horizontal pixel number of the image data currently subjected to printing, and determines whether or not resizing of the image data is necessary. If the vertical-and-horizontal pixel number of the image data 201 shown in FIG. 2 is larger than the vertical-and-horizontal pixel number notified by the printer 11, it is determined that resizing is necessary, and the control proceeds to step S103. Meanwhile, if the vertical-and-horizontal pixel number of the image data 201 is equal to or smaller than the vertical-and-horizontal pixel number notified by the printer 11, it is determined that resizing is not necessary, and the control proceeds to step S104.

In step S103, the digital camera 12 performs resizing by the image resizing processor 12c so that the image data 201 fits the vertical-and-horizontal pixel number required by the printer, which is notified in step S101. To obtain the vertical-and-horizontal pixel number to be fit, the value stored in the printing data management memory 12b in step S101 is referred. For instance, as shown in FIG. 2, assume that the vertical-and-horizontal pixel number of the image data 201 is 1200×1600, and that the vertical-and-horizontal pixel number that can be printed with the current printing condition of the printer 11 is 600×800. In this case, in step S103, the image data 201 is resized to image data 202 having 600 vertical pixels and 800 horizontal pixels. In this stage, since the vertical-and-horizontal pixel number that constitutes the image data 201 and the vertical-and-horizontal pixel number that can be printed by the printer 11 are not necessarily similar figures, part of the image data 201 is cut off at the time of resizing, or resizing is performed while resigning a margin.

In step S104, the printer 11 notifies the digital camera 12 whether the image data constituted with the vertical-and-horizontal pixel number notified in step S101 is to be subjected to resizing and rotating before it is transferred to the printer 11 or the image data is not to be subjected to rotating before it is transferred to the printer 11.

In step S105, the digital camera 12 determines whether or not image rotation has been requested by the printer 11 in step S104. If rotation has been requested, the control proceeds to step S106; otherwise, the control proceeds to step S107.

In step S106, the digital camera 12 performs image rotation on the resized image data 202 by the image rotation processor 12d, and obtains image data 203.

In step S107, the digital camera 12 performs compression on the image data, which has been resized or rotated as needed based on the request from the printer 11, by the image expansion/compression processor 12e. Although a compression method is not particularly specified herein, generally a reversible compression method represented by PackBits or the like, or a nonreversible compression method represented by JPEG or the like is selected.

In step S108, the digital camera 12 transfers the image data compressed in step S107 to the printer 11 via the communication controller 12a and the communication controller 11a.

In step S109, the printer 11 expands the received image data by the image expansion/compression processor 11f to obtain the image data.

In step S110, the printer 11 determines whether or not the image data which has been expanded upon reception requires image rotation, and also determines whether or not image rotation has been performed by the digital camera 12. If it is determined that image rotation is necessary but has not been performed, the control proceeds to step S111; otherwise, the control proceeds to step S112. If image rotation has been performed by the digital camera 12, the control proceeds to step S112.

In step S111, the printer 11 performs image rotation on the expanded image data by the image rotation processor 11d.

In step S112, the printer 11 determines whether or not the image data which has been expanded upon reception requires resizing, and also determines whether or not resizing has been performed by the digital camera 12. If it is determined that resizing is necessary but has not been performed, the control proceeds to step S113; otherwise, the control proceeds to step S114. Meanwhile, if image resizing has been performed by the digital camera 12, the control proceeds to step S114.

In step S113, the printer 11 performs resizing on the expanded image data by the image resizing processor 11c.

In step S114, the printer 11 performs color processing by the image color processor 11f on the image data which has been expanded and, as needed, rotated and resized.

In step S115, the printer 11 transfers the color-processed image data to the print controller 11g to perform printing. Upon completion of printing, the control proceeds to step S116 to end the processing.

As is apparent from the above description, according to the first embodiment, by virtue of performing image data resizing and rotating by the digital camera instead of the printer as has been performed conventionally, it is possible to reduce the printer's processing load and processing time. Furthermore, since the embodiment contributes to reduction in the amount of image data transmitted from the digital camera to the printer, it is also possible to reduce data transfer time. As a result, in a case where a digital camera is directly connected to a printer having inferior CPU processing power to that of a personal computer for directly printing image data stored in the digital camera, the printing speed does not lag behind a case of printing image data through a personal computer. Furthermore, since the above-described processing does not involve simplification of the processes or deletion of image data necessary for printing, it does not cause image quality deterioration.

Second Embodiment

Figure 5:
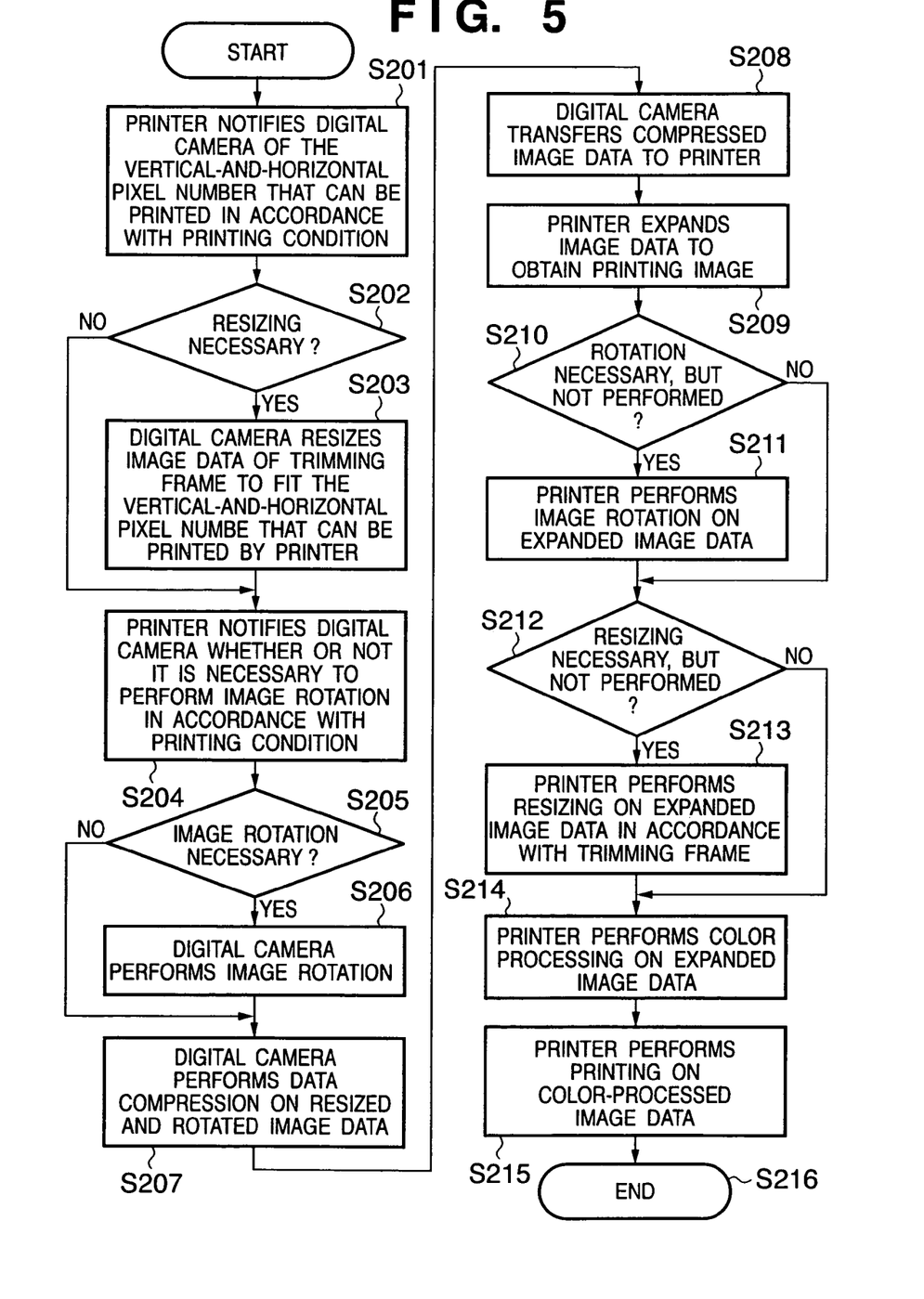
FIG. 5 is a flowchart showing an algorithm for performing resizing and rotating on trimmed image data by a digital camera and performing printing by a printer based on the processed image data.

FIG. 5 is a flowchart executed by the printing system shown in FIG. 1, which describes an algorithm for performing image resizing and image rotating by the digital camera 12 in accordance with a printing condition of the printer 11. In particular, this flowchart shows a case where part of the image data is trimmed and printed.

In step S201, the printer 11 calculates the vertical-and-horizontal pixel number to be printed on paper in accordance with the printing condition, such as the size of paper and resolution. The calculated vertical-and-horizontal pixel number is notified from the communication controller 11a of the printer 11 to the communication controller 12a of the digital camera 12 using a communication protocol which is arbitrarily determined in advance between the printer 11 and the digital camera 12. The notified vertical-and-horizontal pixel number is stored in the printing data management memory 12b of the digital camera 12.

In step S202, the digital camera 12 compares the vertical-and-horizontal pixel number notified by the printer 11 with the vertical-and-horizontal pixel number of the trimmed image data currently subjected to printing, and determines whether or not resizing of the image data is necessary. If the vertical-and-horizontal pixel number of the trimming frame 302 indicated by the dotted line in the image data 301 shown in FIG. 3 is larger than the vertical-and-horizontal pixel number notified by the printer 11, it is determined that resizing is necessary, and the control proceeds to step S203. Meanwhile, if the vertical-and-horizontal pixel number of the trimming frame 302 is equal to or smaller than the vertical-and-horizontal pixel number notified by the printer 11, it is determined that resizing is not necessary, and the control proceeds to step S204.

In step S203, the digital camera 12 performs resizing by the image resizing processor 12c so that the image data in the trimming frame 302 fits the vertical-and-horizontal pixel number required by the printer, which is notified in step S201. To obtain the vertical-and-horizontal pixel number to be fit, the value stored in the printing data management memory 12b in step S201 is referred. For instance, as shown in FIG. 3, assume that the vertical-and-horizontal pixel number of the image data 301 is 1200×1600, the vertical-and-horizontal pixel number of the trimming frame is 750×1000, and the vertical-and-horizontal pixel number that can be printed with the current printing condition of the printer 11 is 600×800. In this case, in step S203, the image data 302 in the trimming frame is resized to image data 303 having 600 vertical pixels and 800 horizontal pixels. In this stage, since the vertical-and-horizontal pixel number that constitutes the image data 302 in the trimming frame and the vertical-and-horizontal pixel number that can be printed by the printer 11 are not necessarily similar figures, part of the image data 301 in the trimming frame is cut off at the time of resizing, or resizing is performed while resigning a margin.

In step S204, the printer 11 notifies the digital camera 12 whether the image data constituted with the vertical-and-horizontal pixel number notified in step S201 is to be subjected to resizing and rotating before it is transferred to the printer 11 or the image data is not to be subjected to rotating before it is transferred to the printer 11.

In step S205, the digital camera 12 determines whether or not image rotation has been requested by the printer 11 in step S204. If rotation has been requested, the control proceeds to step S206; otherwise, the control proceeds to step S207.

In step S206, the digital camera 12 performs image rotation on the resized image data 303 by the image rotation processor 12d, and obtains image data 304.

In step S207, the digital camera 12 performs compression on the image data, which has been resized or rotated as needed based on the request from the printer 11, by the image expansion/compression processor 12e. Although a compression method is not particularly specified herein, generally a reversible compression method represented by PackBits or the like, or a nonreversible compression method represented by JPEG or the like is selected.

In step S208, the digital camera 12 transfers the image data compressed in step S207 to the printer 11 via the communication controller 12a and the communication controller 11a.

In step S209, the printer 11 expands the received image data by the image expansion/compression processor 11f to obtain the image data.

In step S210, the printer 11 determines whether or not the image data which has been expanded upon reception requires image rotation, and also determines whether or not image rotation has been performed by the digital camera 12. If it is determined that image rotation is necessary but has not been performed, the control proceeds to step S211; otherwise, the control proceeds to step S212. If image rotation has been performed by the digital camera 12, the control proceeds to step S212.

In step S211, the printer 11 performs image rotation on the expanded image data by the image rotation processor 11d.

In step S212, the printer 11 determines whether or not the image data which has been expanded upon reception requires resizing, and also determines whether or not resizing has been performed by the digital camera 12. If it is determined that resizing is necessary but has not been performed, the control proceeds to step S213; otherwise, the control proceeds to step S214. Meanwhile, if image resizing has been performed by the digital camera 12, the control proceeds to step S214.

In step S213, the printer 11 performs image resizing on the expanded image data by the image resizing processor 11c in accordance with the trimming frame designated by the digital camera 12. In this case, the digital camera 12 notifies the printer 11 of the area which is designated as a trimming frame.

In step S214, the printer 11 performs color processing by the image color processor 11f on the image data which has been expanded and, as needed, rotated and resized.

In step S215, the printer 11 transfers the color-processed image data to the print controller 11g to perform printing. Upon completion of printing, the control proceeds to step S216 to end the processing.

Note that with respect to the vertical-and-horizontal pixel number notified from the printer 11 to the digital camera 12, the printer 11 may notify the vertical-and-horizontal pixel number, for instance, approximately twice as many as the pixel number that is necessary for actual printing on the paper (note that the amount of data needs to be equal to or smaller than the amount of data storable in the memory of the printer 11). For this reason, it is better to obtain in advance the capacity information regarding the amount of data storable in the memory of the printer.

In other words, the digital camera serving as an image capturing apparatus receives capacity information regarding the amount of image data receivable by the printer, and performs resizing of image data to achieve the vertical-and-horizontal pixel number that is equal to or larger than the vertical-and-horizontal pixel number defined by the predetermined printing condition and that is equal to or smaller than the received capacity information.

By virtue of the above control, it is possible to prevent such situation where the printer cannot receive image data from the digital camera because of a large image size.

In addition, even in a case where the printer requires the vertical-and-horizontal pixel number larger than the pixel number necessary for actual printing on paper for the purpose of image processing unique to the printer, e.g., correction processing based on an image analysis or print data generation processing, since a larger number of vertical and horizontal pixels is notified, it is possible to assure the necessary amount of data.

Note that instead of having the printer 11 enlarge the vertical-and-horizontal pixel number in proportion to the pixel number necessary for actual printing on paper, the embodiment may be constructed so that the digital camera 12 performs resizing of image data to achieve the pixel number larger than the notified vertical-and-horizontal pixel number.

As is apparent from the above description, according to the second embodiment, by virtue of performing image data trimming based on a printing condition of the printer by the digital camera instead of the printer as has been performed conventionally, it is possible to eliminate transfer operation of image data that is not processed by the printer, and overall processing efficiency is improved.

As a result, it is possible to realize reduction in data transfer time. Furthermore, since the amount of image data to be processed by the printer is reduced, it is also possible to realize reduction in image processing time in the printer.

Other Embodiment

As mentioned above, the object of the present invention can also be achieved by providing a storage medium, storing program codes of a software realizing the above-described functions of the embodiments, to a computer system or apparatus, reading the program codes, by a computer (CPU or MPU) of the system or apparatus, from the storage medium, then executing the program. In this case, the program codes read from the storage medium realize the functions according to the embodiments, and the storage medium storing the program codes constitutes the invention. Further, the storage medium, such as a floppy (registered trademark) disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs part or the entire processes in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-023583 filed on Jan. 30, 2004, which is hereby incorporated by reference herein.

What is claimed is:

1. A printing system comprising:
   a printing apparatus; and
   an image capturing apparatus communicably connected to said printing apparatus, wherein said printing apparatus prints image data that is transmitted by said image capturing apparatus to said printing apparatus,
   wherein said printing apparatus comprises a notification unit configured to notify said image capturing apparatus of information regarding the number of vertical and horizontal pixels calculated based on a printing condition for printing image data that is transmitted by said image capturing apparatus and rotation instruction information, which is decided based on the printing condition, indicating whether or not said image capturing apparatus should execute a process of rotating the image data to be transmitted to said printing apparatus, and
   wherein said image capturing apparatus comprises:
     a reception unit configured to receive the information regarding the number of vertical and horizontal pixels and the rotation instruction information of which said image capturing apparatus is notified by said notification unit of said printing apparatus;
     a processing unit configured to execute a reducing process and a rotation process on the image data to be transmitted to said printing apparatus, wherein said processing unit executes the reducing process if the number of vertical and horizontal pixels of the image data to be transmitted to said printing apparatus is larger than the number of vertical and horizontal pixels received by said reception unit, and said processing unit executes the rotation process based on the rotation instruction information received by said reception unit; and
     a transmission unit configured to transmit the image data processed by said processing unit to said printing apparatus,
   wherein said processing unit is configured to execute the reducing process before the rotation process.

2. The printing system according to claim 1, wherein said printing apparatus is further configured to execute a process of rotating the image data transmitted by said transmission unit when, even though said notification unit notified said image capturing apparatus of the rotation instruction information indicating that said image capturing apparatus should execute the process of rotating the image data to be transmitted to said printing apparatus, the process of rotating the image data to be transmitted to said printing apparatus has not been executed.

3. A printing method of printing by a printing apparatus image data that is transmitted by an image capturing apparatus, the printing apparatus and the image capturing apparatus being communicably connected, said method comprising:
   a notifying step of notifying the image capturing apparatus from the printing apparatus of information regarding the number of vertical and horizontal pixels calculated based on a printing condition for printing image data that is transmitted by the image capturing apparatus and rotation instruction information, which is decided based on the printing condition, indicating whether or not the image capturing apparatus should execute a process of rotating the image data to be transmitted to the printing apparatus;
   a reception step of receiving by the image capturing apparatus the information regarding the number of vertical and horizontal pixels and the rotation instruction information of which the image capturing apparatus is notified in said notification step;
   a processing step of executing by the image capturing apparatus a reducing process and a rotation process on the image data to be transmitted to the printing apparatus, wherein the processing step executes the reducing process if the number of vertical and horizontal pixels of the image data to be transmitted to the printing apparatus is larger than the number of vertical and horizontal pixels received in said reception step, and said processing step executes the rotation process based on the rotation instruction information received in said reception step; and
   a transmitting step of transmitting the image data processed in said processing step to the printing apparatus,
   wherein said processing step executes the reducing process before the rotation process.

4. An image capturing apparatus communicably connected with a printing apparatus which prints transmitted image data comprising:
   a reception unit configured to receive from the printing apparatus information regarding the number of vertical and horizontal pixels calculated based on a printing condition for printing image data transmitted by said image capturing apparatus and a rotation instruction, which is decided based on the printing condition, indicating whether or not said image capturing apparatus should execute a process of rotating the image data to be transmitted to the printing apparatus;
   a processing unit configured to, execute a reducing process and a rotation process on the image data to be transmitted to the printing apparatus, wherein said processing unit executes the reducing process if the number of vertical and horizontal pixels of the image data to be transmitted to the printing apparatus is larger than the number of vertical and horizontal pixels received by said reception unit, and said processing unit executes the rotation process based on the rotation instruction received by said reception unit; and a transmission unit configured to transmit the image data processed by said processing unit to the printing apparatus, wherein said processing unit is configured to execute the reducing process before the rotation process.

5. An image processing method of an image capturing apparatus communicably connected with a printing apparatus which prints transmitted image data comprising:

a receiving step of receiving from the printing apparatus information regarding the number of vertical and horizontal pixels calculated based on a printing condition for printing image data transmitted by the image capturing apparatus and a rotation instruction, which is decided based on the printing condition, indicating whether or not the image capturing apparatus should execute a process of rotating the image data to be transmitted to the printing apparatus;

a processing step of, executing a reducing process and a rotation process on the image data to be transmitted to the printing apparatus, wherein said processing step executes the reducing process if the number of vertical and horizontal pixels of the image data to be transmitted to the printing apparatus is larger than the number of vertical and horizontal pixels received in said reception step, and said processing step executes the rotation process based on the rotation instruction received in said reception step; and a transmitting step of transmitting the image data processed in said processing step to the printing apparatus, wherein said processing step executes the reducing process before the rotation process.

* * * * *